United States Patent
Esbensen et al.

(10) Patent No.: US 12,297,808 B2
(45) Date of Patent: May 13, 2025

(54) WIND TURBINE COMPRISING RECIPROCATING SWEPT AREA AND METHOD OF CONTROLLING A WIND TURBINE

(71) Applicant: Siemens Gamesa Renewable Energy A/S, Brande (DK)

(72) Inventors: Thomas Esbensen, Herning (DK); Gustav Hoegh, Vejle (DK); Kasper Laugesen, Esbjerg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 120 days.

(21) Appl. No.: 17/909,687

(22) PCT Filed: Feb. 11, 2021

(86) PCT No.: PCT/EP2021/053295
§ 371 (c)(1),
(2) Date: Sep. 6, 2022

(87) PCT Pub. No.: WO2021/180411
PCT Pub. Date: Sep. 16, 2021

(65) Prior Publication Data
US 2023/0108917 A1     Apr. 6, 2023

(30) Foreign Application Priority Data

Mar. 10, 2020   (EP) ..................................... 20162072

(51) Int. Cl.
*F03D 7/02* (2006.01)
*B63B 35/44* (2006.01)
(Continued)

(52) U.S. Cl.
CPC ............ *F03D 7/0204* (2013.01); *B63B 35/44* (2013.01); *F03D 7/028* (2013.01); *F03D 7/048* (2013.01);
(Continued)

(58) Field of Classification Search
CPC ........ F03D 7/0204; F03D 7/028; F03D 7/048; F03D 13/25; B63B 35/44;
(Continued)

(56) References Cited

U.S. PATENT DOCUMENTS 10,612,519 B2 *   4/2020   Franke .................. F03D 7/0204
2010/0054939 A1 * 3/2010   Hoffmann ............... F03D 7/043
                                                            290/44
(Continued)

FOREIGN PATENT DOCUMENTS

| CN | 110173396 A  | 8/2019 |
| DK | 201470456 A1 | 5/2015 |
| EP | 2159415 A2   | 3/2010 |
| EP | 2426356 A1   | 3/2012 |

OTHER PUBLICATIONS

PCT International Search Report and Written Opinion of International Searching Authority mailed May 26, 2021 corresponding to PCT International Application No. PCT/EP2021/053295 filed Mar. 11, 2021.

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A wind turbine includes tower, a nacelle mounted at the top of the tower, a rotor mounted rotatable relatively to the nacelle about a rotation axis and includes at least one blade, wherein the blade, when rotating about the rotation axis, is
(Continued)

configured to span a swept area, and a control device which is configured to control an actuator so as to move the swept area.

11 Claims, 2 Drawing Sheets

(51) Int. Cl.
*F03D 7/04* (2006.01)
*F03D 13/25* (2016.01)
(52) U.S. Cl.
CPC ........ *F03D 13/25* (2016.05); *B63B 2035/446* (2013.01); *F05B 2240/93* (2013.01); *F05B 2270/204* (2020.08); *F05B 2270/32* (2013.01)
(58) Field of Classification Search
CPC ........... B63B 2035/446; F05B 2250/93; F05B 2270/204; F05B 2270/32
See application file for complete search history.

(56) References Cited

U.S. PATENT DOCUMENTS

| | | | |
|---|---|---|---|
| 2014/0044541 A1* | 2/2014 | Dupin De La Gueriviere | F03D 17/00 416/85 |
| 2014/0117668 A1* | 5/2014 | Jayant | F03D 7/048 290/44 |
| 2014/0217742 A1* | 8/2014 | Caruso | F03D 1/065 290/55 |
| 2015/0211486 A1* | 7/2015 | de Boer | F03D 7/0224 290/44 |
| 2015/0219075 A1* | 8/2015 | Cardinal | F03D 7/048 290/44 |
| 2015/0267683 A1* | 9/2015 | Ubben | F03D 7/00 290/44 |
| 2015/0308413 A1* | 10/2015 | Bhaskar | F03D 9/257 290/44 |
| 2016/0146190 A1* | 5/2016 | Ravindra | F03D 9/257 290/44 |
| 2017/0284368 A1* | 10/2017 | Franke | F03D 7/0292 |

* cited by examiner

WIND TURBINE COMPRISING RECIPROCATING SWEPT AREA AND METHOD OF CONTROLLING A WIND TURBINE

CROSS-REFERENCE TO RELATED APPLICATIONS

This application claims priority to PCT Application No. PCT/EP2021/053295, having a filing date of Feb. 11, 2021, which claims priority to EP Application No. 20162072.1, having a filing date of Mar. 10, 2020, the entire contents both of which are hereby incorporated by reference.

FIELD OF TECHNOLOGY

The following relates to a wind turbine comprising a variable swept area and to a method of controlling such a wind turbine.

SUMMARY

A maximum power output of a wind turbine can be determined by the Betz's law which is derived from the principles of conservation of mass and momentum of the air stream flowing through an idealized "actuator disk" that extracts energy from a wind stream. According to the Betz's law, a turbine cannot capture more than 16/27 (59.3%) of the kinetic energy of the wind. The factor 16/27 is known as Betz's coefficient. In practice, utility-scaled wind turbines can achieve a maximum of about 75-80% of the Betz's coefficient. The Betz's coefficient is based on an open-disk actuator. If a diffuser is used to collect and direct an additional wind flow to the turbine, more energy can be extracted, but the limit still applies to the cross-section of the entire structure. Furthermore, the use of the diffuser to cover a larger swept area turned out to be expensive and complex.

SUMMARY

There may be a need for a wind turbine and a method of controlling such a wind turbine which provide for a higher efficiency of the wind turbine.

According to a first aspect of embodiments of the invention, a wind turbine comprises a tower, a nacelle mounted at the top of the tower, a rotor mounted rotatable relatively to the nacelle about a rotation axis and comprising at least one blade, wherein the blade, when rotating about the rotation axis, is configured to span a swept area, and a control device which is configured to control an actuator so as to move the swept area. Moving the swept area can be interpreted that the swept area is moved relatively to a global coordinate system or a global reference point, for example to any reference point at the sea ground.

The swept area is dynamically moved for an improved power output. Sufficiently large translations and rotations of the swept area provide for an increased efficient swept area and can be optimized based on a preview. An immediately advantage is an overall increase in the wind farm power production, which contributes to lower the levelized cost of energy (LCOE).

The wind turbine can be a floating wind turbine that has additional degrees of freedom which may be exploited to cover a larger swept area to increase the power output of the wind turbine and the overall wind turbine park compared with traditional stationary wind turbines.

If the swept area is moved fast enough, the wind turbine can remarkably gain more power because the effective swept area is increased. The principle is that the induction zone reduces the wind speed so that, if a larger swept area is covered, the effective wind speed on the rotor is theoretically increased. It depends on how quickly the axial induction zone develops relative to the movement speed of the swept area.

In an embodiment, the control device is configured to alter the movement of the swept area based on a measured, estimated or predicted speed of wind to the wind turbine. In an embodiment, the control device can be configured to set a speed of moving the swept area based on the wind speed, wherein the speed of moving the swept area is increased when the wind speed increases, and the speed of moving the swept area is decreased when the wind speed decreases. The induction zone generally exists a fixed number of rotor diameters upwind (and downwind) of the wind turbine. At higher wind speeds, the wind moves faster through this zone and thereby the induction zone is established faster, thus requiring a higher movement speed of the swept area.

In an embodiment, the control device is configured to control the actuator so as to reciprocatingly move the swept area. By this measure, a simple control is implemented, while the wind turbine's efficiency can remarkably be increased.

In an embodiment, the swept area is moved by at least one of a translational movement and a rotational movement, for example relatively to the global reference point.

In an embodiment, the wind turbine is an offshore wind turbine comprising a floating hull onto which the tower is mounted, wherein the hull is connected to a first fixing point at a sea ground via a first mooring line and to a second fixing point at the sea ground via a second mooring line, wherein the actuator comprises means to change at least one of a length of the first mooring line between the first fixing point and the hull and of a length of the second mooring line between the second fixing point and the hull in a manner that the swept area is moved.

In an embodiment, the wind turbine is an offshore wind turbine comprising a floating hull onto which the tower is mounted, wherein the actuator comprises a ballast control system which is configured to move a ballast body or a ballast fluid inside the hull in a manner that the swept area is moved.

In an embodiment, the control device is configured to move the swept area, if a at least one of the following conditions is fulfilled: the wind turbine is operated below a rated output power of the wind turbine, the wind turbine is within a wake of another wind turbine; if a wind speed is below a reference wind speed; if a power, which is consumed by the actuator to move the rotor, is lower than a first predetermined ratio of an actual output power of the wind turbine; and if the power, which is consumed by the actuator to move the rotor, is lower than a second predetermined ratio of a power which is gained by moving the swept area. For example, the first predetermined ratio can be 50%, 25% or 10%, and the second predetermined ratio can be 100%, 75% or 50%. The second predetermined ratio provides a kind of hysteresis bearing in mind that an (estimated) power which is gained by moving the swept area 200 may have some fluctuation.

This control strategy considers a reasonable energy balance. The swept area and rotor movements need to be energy efficient such that the captured extra power by avoiding the wake's impact should exceed the energy used for the movement. This is part of the control strategy to only initiate the movement when an energy gain is possible.

In an embodiment, the control device is configured to decelerate or stop the movement of the swept area, if at least one of the following conditions is fulfilled: if a power, which is consumed by the actuator to move the rotor, exceeds a first threshold value; and if a load parameter, a fatigue parameter or an instability parameter, which is caused by the movement of the rotor, exceeds a second threshold value.

This control strategy considers a safe operation. The swept area and rotor movements need to be load efficient such that too much additional load by this movement should be avoided. This is part of the control strategy to only initiate the swept area movement when the load allows the same, e.g. not to drive extreme loads or to cause significant fatigue or instabilities. This can be realized by monitoring load/acceleration variables online or by scheduling the movement by designed control strategies. Furthermore, the movement should consider park boundaries as well, which may be static or even dynamic with respect to e.g., incoming boats, other turbines and sailing lines.

According to a second aspect of embodiments of the invention, a wind park control device is configured to control at least two of the above-mentioned wind turbines. The wind park control device is connected to at least one control device of the at least two wind turbines. The wind park control device is configured to perform a coordinated control in a manner that a wake of one of the at least two wind turbines is at least not continuously directed to the other one of the at least two wind turbines. For example, one of the wind turbines can continuously be outside a wake of another wind turbine when both wind turbines are synchronously be moved. In another embodiment, both wind turbines can be moved in opposite directions so that one of the wind turbines can be inside a wake of another wind turbine only for a short time.

In this approach, the swept area is changed to avoid the impact of a wake of another wind turbine. Wind turbines placed inside a wind farm interact with each other through their wakes. The wake of a wind turbine is a result of an energy extraction of the incoming flow. The wake causes a reduced wind speed, also known as a wind deficit, and an increased wind speed variation, also known as turbulence. These phenomena result in a decrease of the overall power production of the wind farm and in an increase of the loads for the downstream wind turbines (downstream wind turbines are turbines behind a front wind turbine that may create the wake). The decrease of power is a direct result of the lower wind speed, while an increase of a mechanical load caused by variations of the mechanical load can be a consequence of the turbulences.

Movements trajectories of the swept areas of the wind turbines of the wind park can be coordinated or optimized to maximize the output power on park level.

For example, a control system that has information about park wind direction and wind turbine positions can implement a distributed control strategy (or individual setpoints) to the wind turbines such that they are controlled in order to maximize the output power on park level. This can be done for upwind turbines to coordinate movement with downwind turbines to reduce an impact of wake, e.g. for up- and downwind turbines to synchronously move or to move in opposite directions when the downwind turbine is in full wake of the upwind turbine.

According to a third aspect of embodiments of the invention, a method of controlling a wind turbine is provided. The wind turbine comprises a tower, a nacelle mounted at the top of the tower, and a rotor mounted rotatable relatively to the nacelle about a rotation axis and comprising at least one blade, wherein the blade, when rotating about the rotation axis, is configured to span a swept area. The method comprises a step of moving the swept area, for example relatively to the global reference point.

BRIEF DESCRIPTION

Some of the embodiments will be described in detail, with reference to the following figures, wherein like designations denote like members, wherein.

DETAILED DESCRIPTION

Figure 1:
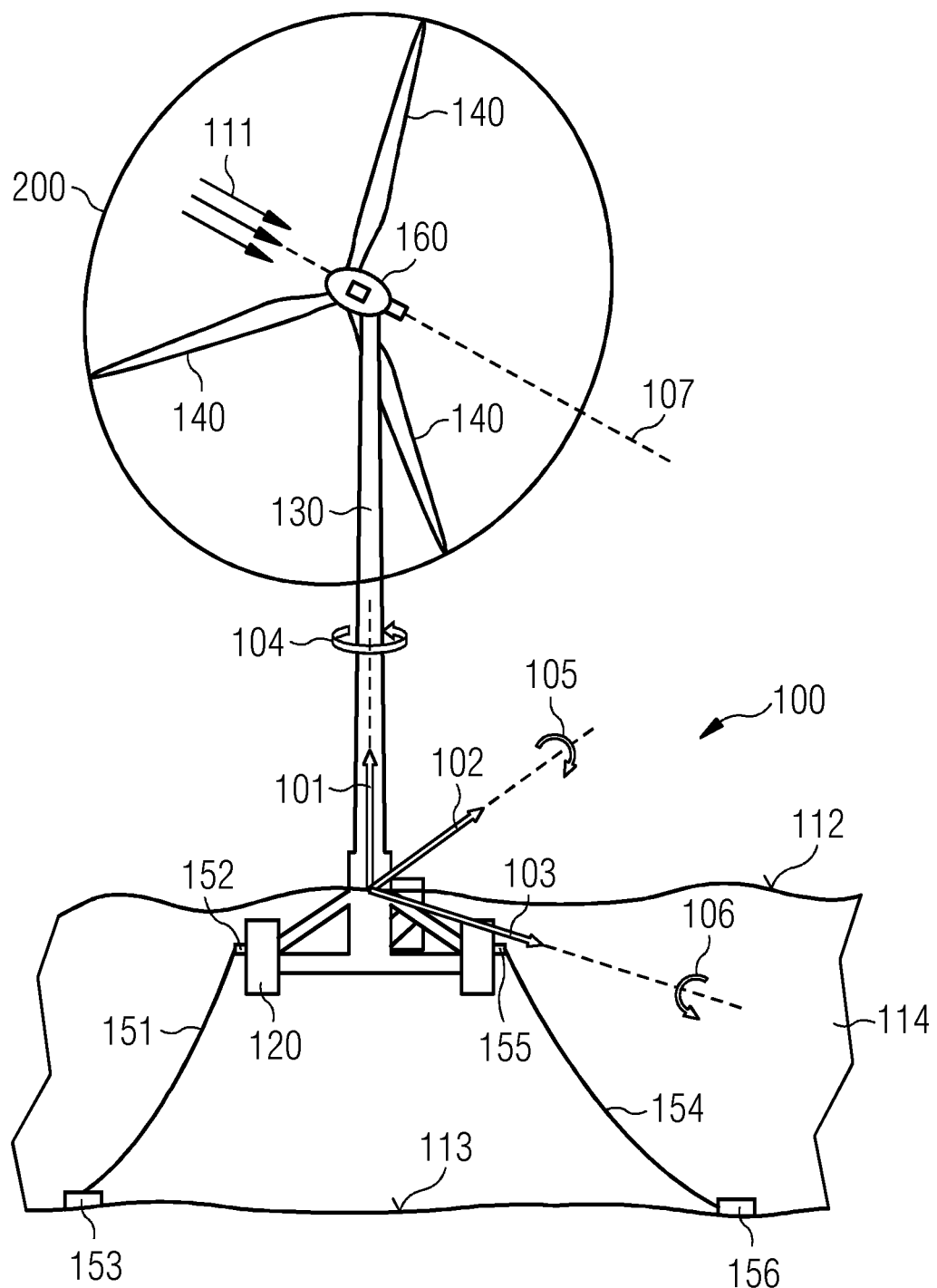
FIG. 1 shows a wind turbine and the different elements thereof.

The illustrations in the drawings are schematically. It is noted that in different figures, similar or identical elements are provided with the same reference signs.

FIG. 1 shows a wind turbine 100. The wind turbine 100 comprises a nacelle 160 and a tower 130. The nacelle 160 is mounted at the top of the tower 130. The nacelle 160 is mounted rotatable relative to the tower 130 by means of a yaw bearing in order to establish a nacelle yaw. The axis of rotation of the nacelle 160 relative to the tower 130 is referred to as yaw axis (cf. reference sign 104).

The wind turbine 100 also comprises a rotor having, for example, three rotor blades 140. Each blade 140 can usually be rotated about a longitudinal axis of the blade 140 to establish a desired blade pitch or pitch angle of the blade 140.

The rotor is rotatable mounted relative to the nacelle 160 by means of a bearing. The rotor is mounted rotatable about a rotation axis 107. When the blades 140 are subjected to a wind 111, they are rotated together with the rotor about the rotation axis 107. The blades 140, when rotating about the rotation axis 107, span a swept area 200.

The wind turbine 100 furthermore comprises a generator. The generator is accommodated within the nacelle 160. The generator is arranged and prepared for converting rotational energy from the rotor into electrical energy in the shape of an AC power.

The wind turbine 100 is an offshore wind turbine 100 comprising a floating hull 120 onto which the tower 130 is mounted. The hull 120 floats on a sea level 112 of a sea 114. The hull 120 is connected to a first fixing point 153 at a sea ground 113 via a first mooring line 151 and to a second fixing point 156 at the sea ground 113 via a second mooring line 154. The first mooring line 151 is connected to the hull 120 at a third fixing point 152, and the second mooring line 154 is connected to the hull 120 at a fourth fixing point 155. The installed offshore wind turbine 100 floats in the water 114 and is normally held in position by the mooring lines 151 which either stabilize the system or prevent the same from drifting away.

The wind turbine 100 has six individual degrees of freedom in which the wind turbine 100 may move. Namely three translations along a surge axis 103, a sway axis 102, and a heave axis 101 along with three rotations along a floater roll axis 106, a floater pitch axis 105 and a floater yaw axis 104.

The pitch about the floater pitch axis 105 is thus different from the blade pitch because the pitch about the floater pitch axis 105 is the rotation of the floating structure (for example the tower 130 or the entire wind turbine 100) around its point of rotation, while the blade pitch defines the controlled pitch angle of the blades 140 about the longitudinal axis thereof. Furthermore, the yaw about the floater yaw axis 104 is different from the nacelle yaw because the yaw about the floater yaw axis 104 is the rotation around the vertical axis of the floating structure (for example the tower 130 or the entire wind turbine 100), while the nacelle yaw is the yaw of the nacelle 160 which can be measured relatively to the tower 130 and actively be controlled by the wind turbine 100.

The wind turbine 100 comprises an actuator (not shown) which is configured to move the tower 130 or the entire wind turbine 100 and thus the swept area 200 at least in one of the three translations along the surge axis 103, the sway axis 102, and the heave axis 101, and the three rotations about the floater roll axis 106, the floater pitch axis 105 and the floater yaw axis 104. In order to realize embodiments of the present invention, it is not necessary to move the entire wind turbine 100 in order to move the swept area 200. It is sufficient if only the rotor is moved by the actuator so as to move the swept area 200. In the following, the specification sometimes refers to a movement of the swept area 200 or the rotor even though the entire wind turbine 100 is moved by the actuator.

The wind turbine 100 comprises a control device (not shown) which is configured to control the actuator to move the swept area 200, for example along the wind turbine 100. In other words, the actuator is configured to move the swept area 200 relatively to a global reference point.

In an embodiment, the actuator can comprises means to change at least one of a length of the first mooring line 151 between the first fixing point 153 and the third fixing point 152 at the hull 120 and of a length of the second mooring line 154 between the second fixing point 156 and the fourth fixing point 155 at the hull 120 in a manner that the swept area 200 is moved.

In another embodiment, the actuator can comprise a ballast control system which is configured to move a ballast body or a ballast fluid inside the hull 120 in a manner that the swept area 200 is moved. However, embodiments of the present invention can be realized by any other actuator which is capable to move the swept area 200.

Figure 2:
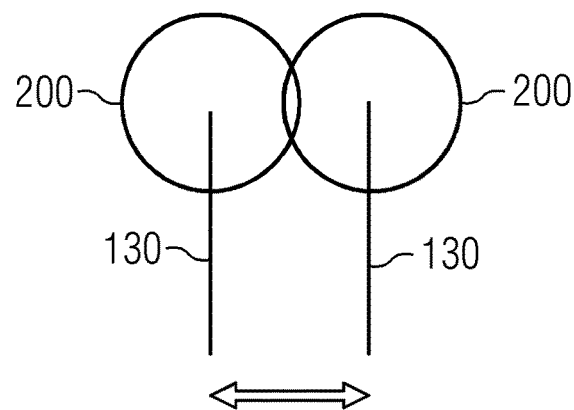
FIG. 2 shows a translational movement of a swept area.

FIG. 2 shows a translational movement of a swept area 200. The swept area 200 is translationally moved along the sway axis 102 in FIG. 1. The control device is configured to control the actuator to reciprocatingly move the swept area 200 back and forth.

Figure 3:
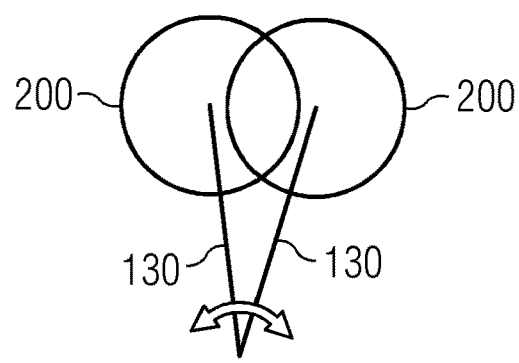
FIG. 3 shows a rotational movement of a swept area.

FIG. 3 shows a rotational movement of a swept area 200. The swept area 200 is rotated about the floater roll axis 106 in FIG. 1. The control device is configured to control the actuator to reciprocatingly rotate the swept area 200 back and forth.

Figure 4:
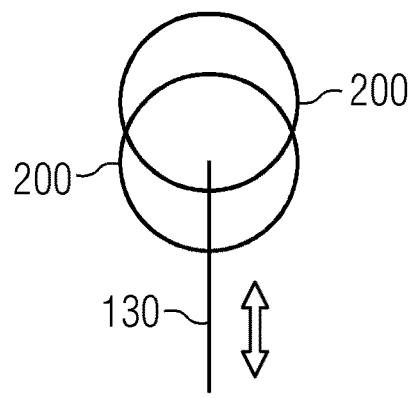
FIG. 4 shows a heave movement of a swept area.

FIG. 4 shows a heave movement of a swept area 200. The swept area 200 is translationally moved along the heave axis 101 in FIG. 1. The control device is configured to control the actuator to reciprocatingly move the swept area 200 back and forth.

The rotor of the individual wind turbine 100 is moved to alter the swept area 200 so that the rotor captures more wind energy from an "extended" swept area 200 than if the rotor would be at a fixed position.

If the rotor is moved fast enough, the wind turbine 100 can gain wind energy because it covers an enlarged effective swept area 200 being swept by the rotor. The principle is that the induction zone reduces a wind speed, so if a larger swept area 200 is covered, the effective wind speed on the rotor can be increased. It depends on how quickly the axial induction zone develops relative to the movement speed of the swept area. The control device can control this movement of the swept area along the rotor. For example, the control device can be configured to set a speed of moving the swept area 200 based on a wind speed, wherein the speed of moving the swept area 200 is increased when the wind speed increases, and the speed of moving the swept area 200 is decreased when the wind speed decreases.

By the above-mentioned control strategies, the wind turbine 100 can be controlled without inter-turbine coordination, that means like a stand-alone turbine.

The control device can also be configured to move the swept area 200, if a at least one of the following conditions is fulfilled: the wind turbine 100 is operated below a rated output power of the wind turbine 100; the wind turbine 100 is within a wake of another wind turbine (wherein the wake can be determined based on the actual positions of the corresponding wind turbines and a wind flow direction); if a wind speed is below a reference wind speed; if a power, which is consumed by the actuator to move the rotor, is lower than a first predetermined ratio of an actual output power of the wind turbine 100; and if a power, which is consumed by the actuator to move the rotor, is lower than a second predetermined ratio of a power which is gained by moving the swept area 200. This may be a function of power or wind speed and can be computed in advance or online. For example, the first predetermined ratio can be 50%, 25% or 10%, and the second predetermined ratio can be 100%, 75% or 50%. The second predetermined ratio provides a kind of hysteresis bearing in mind that the (estimated) power which is gained by moving the swept area 200 may have some fluctuation.

The above-mentioned condition, where the power is considered, which is consumed by the actuator to move the rotor, enables an optimized energy balance. The movement of the rotor needs to be energy efficient such that the extra energy captured from a reduction of a wake shall exceed the energy used for the movement of the rotor. This measure can be part of the control strategy to only initiate the movement of the rotor when an energy gain is possible.

The control device can be configured to alter the movement of the swept area 200 based on a measured, estimated or predicted speed of wind 111 to the wind turbine 100. For example, a LIDAR (light detection and ranging) or a radar could be used to scan the incoming wind field in advance, and this information can be utilized to optimize the strategy to capture the highest amount of wind (power), e.g., exploiting shear, wakes, etc. The control device can be configured to set a speed of moving the swept area 200 based on the measured, estimated or predicted wind speed, wherein the speed of moving the swept area 200 is increased when the wind speed increases, and the speed of moving the swept area 200 is decreased when the wind speed decreases.

The control device can be configured to decelerate or stop the movement of the swept area 200, if at least one of the following conditions is fulfilled: if a power, which is consumed by the actuator to move the rotor, exceeds a first threshold value; and if a load parameter, a fatigue parameter or an instability parameter, which is caused by the movement of the rotor, exceeds a second threshold value. The consideration of the load parameter, the fatigue parameter or the instability parameter provides for a safe operation. The rotor movement needs to be load efficient such that an excessive additional load by this movement is not allowed. This can be part of a control strategy only to initiate the rotor's movement when the load is allowable. This can be carried out by monitoring load and acceleration variables online, or by scheduling the rotor's movement by a designed control strategy. Furthermore, the rotor's movement should consider park boundaries as well, which may be static or even dynamic with respect incoming boats, other turbines and sailing lines, for example.

A plurality of the wind turbines 100 can be controlled by a wind park control device (not shown). The wind park control device can be connected to each control device of each wind turbine 100. The wind park control device can be configured to perform a coordinated control in a manner that a wake of one wind turbine 100 is at least not continuously directed to another wind turbine 100. For example, one of the wind turbines 100 can continuously be outside a wake of another wind turbine 100 when both wind turbines 100, 100 are synchronously be moved in the same direction. In another embodiment, both wind turbines 100, 100 can be moved in opposite directions so that one of the wind turbines 100 may be inside a wake of another wind turbine 100 only for a short time.

The wind turbines 100 placed inside the wind farm interact with each other through their wakes. The wake of the wind turbine 100 is a result of energy extraction of the incoming wind 111. The wake causes a reduced wind speed, also known as a wind deficit, and an increased wind speed variation, also known as turbulence. These phenomena result in a decrease of the overall power production of the wind farm and an increase of the loads for a downstream wind turbine 100. A downstream wind turbine 100 is a wind turbine 100 that is placed behind another wind turbine 100 downstream of the wind 111, wherein the other wind turbine 100 in front row generates the wake. The decrease of power production or output power is a direct result of the wind speed which is decreased due to the wake, while the increase in the wind speed variation caused by the turbulences can cause variations in mechanical loads.

The above-mentioned control strategies use an inter-turbine coordination. For example, trajectories of the rotor movements of the wind turbines 100 can be optimized on wind park level to maximize the power generation.

The wind park control device that has information about a direction of the wind 111 in the wind park and about positions of the wind turbines 100 can distribute control strategies (or setpoints) to the individual wind turbines 100 such that they are controlled to maximize the power generation on wind park level. For example, this can be done for upwind wind turbines 100 to coordinate the rotor movement with downwind wind turbines 100 to reduce an impact of the wakes, e.g. for up- and downwind wind turbines 100 to synchronously move or to move in opposite directions when a downwind wind turbine 100 is substantially completely in a wake of an upwind wind turbine 100.

For capturing the wind energy, it is only necessary to perform this rotor movement whenever the wind turbines 100 are operating below a rated power. It may be beneficial to the mechanical load to perform the above-mentioned control strategy also above a rated wind speed as well, when the wind turbines 100 are in a wake.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
   a tower, a nacelle mounted at the top of the tower,
   a rotor mounted rotatable relatively to the nacelle about a rotation axis and comprising at least one blade, wherein the blade, when rotating about the rotation axis, is configured to span a swept area, wherein the swept area forms a wind capture area of the rotor, and
   a control device which is configured to control an actuator so as to reciprocatingly move the wind capture area with reference to a global reference point to provide an increased wind capture area and increase wind energy captured by the wind turbine during reciprocating movement of the wind capture area due to the increased wind capture area,
   wherein the control device is configured to move the wind capture area if a power consumed by the actuator to move the wind capture area is less than 50% of an actual output power of the wind turbine and if the power consumed by the actuator to move the wind capture area is less than a power gained during reciprocating movement of the wind capture area.

2. The wind turbine according to claim 1, wherein the control device is configured to decelerate or stop the movement of the wind capture area if the power consumed by the actuator to move the wind capture area, exceeds a first threshold value.

3. The wind turbine according to claim 1, wherein the control device is configured to decelerate or stop the movement of the wind capture area if a load parameter, a fatigue parameter or an instability parameter, which is caused by the movement of the wind capture area, exceeds a second threshold value.

4. The wind turbine according to claim 1, wherein the control device is configured to alter the movement of the wind capture area based on a measured, estimated or predicted speed of wind to the wind turbine.

5. The wind turbine according to claim 1, wherein the control device is configured to set a speed of moving the wind capture area based on a wind speed, wherein the speed of moving the wind capture area is increased when the wind speed increases, and the speed of moving the wind capture area is decreased when the wind speed decreases.

6. The wind turbine according to claim 1, wherein the wind capture area is moved by at least one of a translational movement and a rotational movement.

7. The wind turbine according to claim 1, wherein the wind turbine is an offshore wind turbine comprising a floating hull onto which the tower is mounted, wherein the hull is connected to a first fixing point at a sea ground via a first mooring line and to a second fixing point at the sea ground via a second mooring line, wherein the actuator comprises means to change at least one of a length of the first mooring line between the first fixing point and the hull and of a length of the second mooring line between the second fixing point and the hull in a manner that the wind capture area is moved.

8. The wind turbine according to claim 1, wherein the wind turbine is an offshore wind turbine comprising a floating hull onto which the tower is mounted, wherein the actuator comprises a ballast control system which is configured to move a ballast body or a ballast fluid inside the hull in a manner that the wind capture area is moved.

9. A wind park control device configured to control at least two wind turbines, wherein at least one wind turbine of the at least two wind turbines is the wind turbine according to claim 1, wherein the wind park control device is connected to at least one control device of the at least two wind turbines; and the wind park control device is configured to perform a coordinated control in a manner that a wake of one of the at least two wind turbines is at least not continuously directed to the other one of the at least two wind turbines.

10. A method of controlling a wind turbine, the wind turbine comprising a tower, a nacelle mounted at the top of the tower, and a rotor mounted rotatable relatively to the nacelle about a rotation axis and comprising at least one blade, wherein the blade, when rotating about the rotation axis, is configured to span a swept area, wherein the swept area forms a wind capture area of the rotor, the method comprising a step of: reciprocatingly moving the wind capture area with reference to a global reference point to increase the wind capture area and increase wind energy captured by the wind turbine during reciprocating movement of the wind capture area due to the increased wind capture area, wherein the wind capture area is moved if a power consumed to move the wind capture area is less than 50% of an actual output power of the wind turbine and if the power consumed to move the wind capture area is less than a power gained during reciprocating movement of the wind capture area.

11. The wind turbine according to claim 1, wherein reciprocating movement of the wind capture area increases the wind capture area and increases wind energy captured by the wind turbine during reciprocating movement of the wind capture area by avoiding and/or minimizing development of an induction area.

* * * * *